(12) United States Patent
Matsumoto et al.

(10) Patent No.: US 7,877,761 B2
(45) Date of Patent: Jan. 25, 2011

(54) OPTICAL DISC APPARATUS

(75) Inventors: Koji Matsumoto, Ichikawa (JP); Yosuke Ishizuka, Kawasaki (JP); Shinsuke Takatsuka, Hitachinaka (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 520 days.

(21) Appl. No.: 12/034,722

(22) Filed: Feb. 21, 2008

(65) Prior Publication Data

US 2009/0064211 A1 Mar. 5, 2009

(30) Foreign Application Priority Data

Aug. 27, 2007 (JP) ............................. 2007-220102

(51) Int. Cl.
G11B 17/03 (2006.01)
(52) U.S. Cl. ..................................... 720/604
(58) Field of Classification Search ................ 720/604, 720/601, 602, 603, 600, 606
See application file for complete search history.

(56) References Cited

U.S. PATENT DOCUMENTS 7,089,569 B2 * 8/2006 Matsui et al. ................ 720/611
2006/0212884 A1 * 9/2006 Yang .......................... 720/619

* cited by examiner

Primary Examiner—Allen T Cao
(74) Attorney, Agent, or Firm—Antonelli, Terry, Stout & Kraus, LLP.

(57) ABSTRACT

To prevent an optical disc from being removed from a clamper even when an impact force is applied in an optical disc apparatus. A displacement amount by which a disc motor is sunk on the bottom case side is suppressed. In more detail, a convex portion which protrudes in the bottom cover direction is provided at a region including the whole or a part of an orthographically-projected surface of the disc motor on a surface of a bottom case opposed to a rear surface of the disc motor, and in a state of recording or reproducing, the sum of a distance between a motor fixing plate and a bottom cover and a distance between the bottom cover and the convex portion of the bottom case is smaller in the rotational axis direction of the disc motor than the sum of a distance between an optical disc and a tray and an insertion depth by which a clamper is inserted into a center hole of an optical disc.

8 Claims, 11 Drawing Sheets

OPTICAL DISC APPARATUS

CLAIM OF PRIORITY

The present application claims priority from Japanese application serial No. P2007-220102, filed on Aug. 27, 2007, the content of which is hereby incorporated by reference into this application.

BACKGROUND OF THE INVENTION

1. Technical Field of the Invention

The present invention relates to an optical disc apparatus, and particularly to a structure in which an optical disc is prevented from being removed from a clamper at the time of recording or reproducing.

2. Description of the Related Art

Development of a thin optical disc apparatus to be mounted in, for example, a notebook-sized personal computer has been advanced from the past. In recent years, applications of the thin optical disc apparatus are diversified. In response to this, the apparatus is further made thinner and lighter, and it is required to secure the reliability against an impact.

SUMMARY OF THE INVENTION

In order to make an optical disc apparatus thinner and lighter, the thickness dimensions of components are reduced, and clearances between the components are reduced in size. However, these become a factor to hider impact resistance of the apparatus. Further, in a model in which two optical systems of a blue laser optical system and a red laser optical system are mounted for an optical pickup, the dimension and weight of the optical pickup are increased, and the weight of a whole unit mechanical portion is accordingly increased, thus increasing the displacement of the unit mechanical portion when an impact force is applied to the apparatus. Especially, increasing of the displacement of a disc motor in the rotational axis direction during a recording or reproducing operation causes an optical disc being rotated to be removed from a clamper. If the optical disc is removed, the recording or reproducing operation is interrupted. In addition, the optical disc and the apparatus are damaged.

Figure 6:
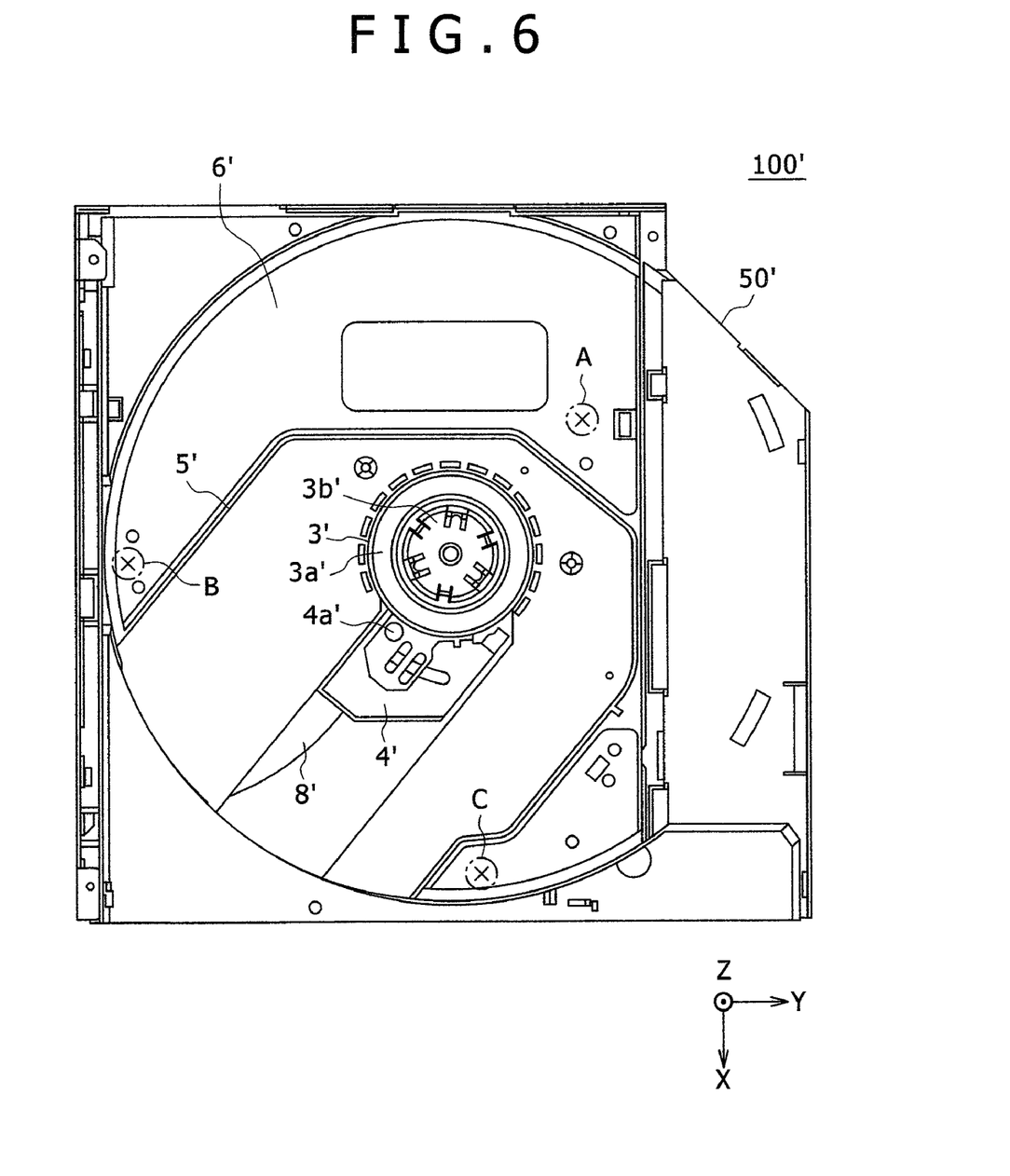
FIG. 6 shows a plane configuration view of a conventional optical disc apparatus on the front surface side.
Figure 7:
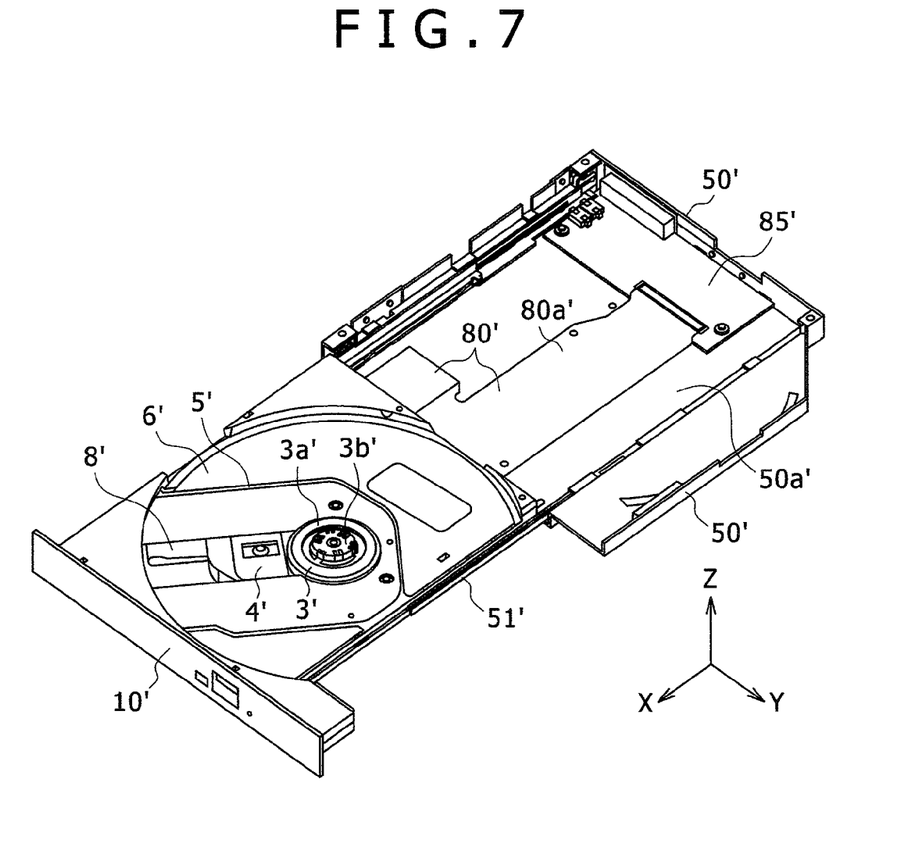
FIG. 7 is a perspective view showing a state in which a tray is pulled out from an apparatus body in the conventional optical disc apparatus.
Figure 8:
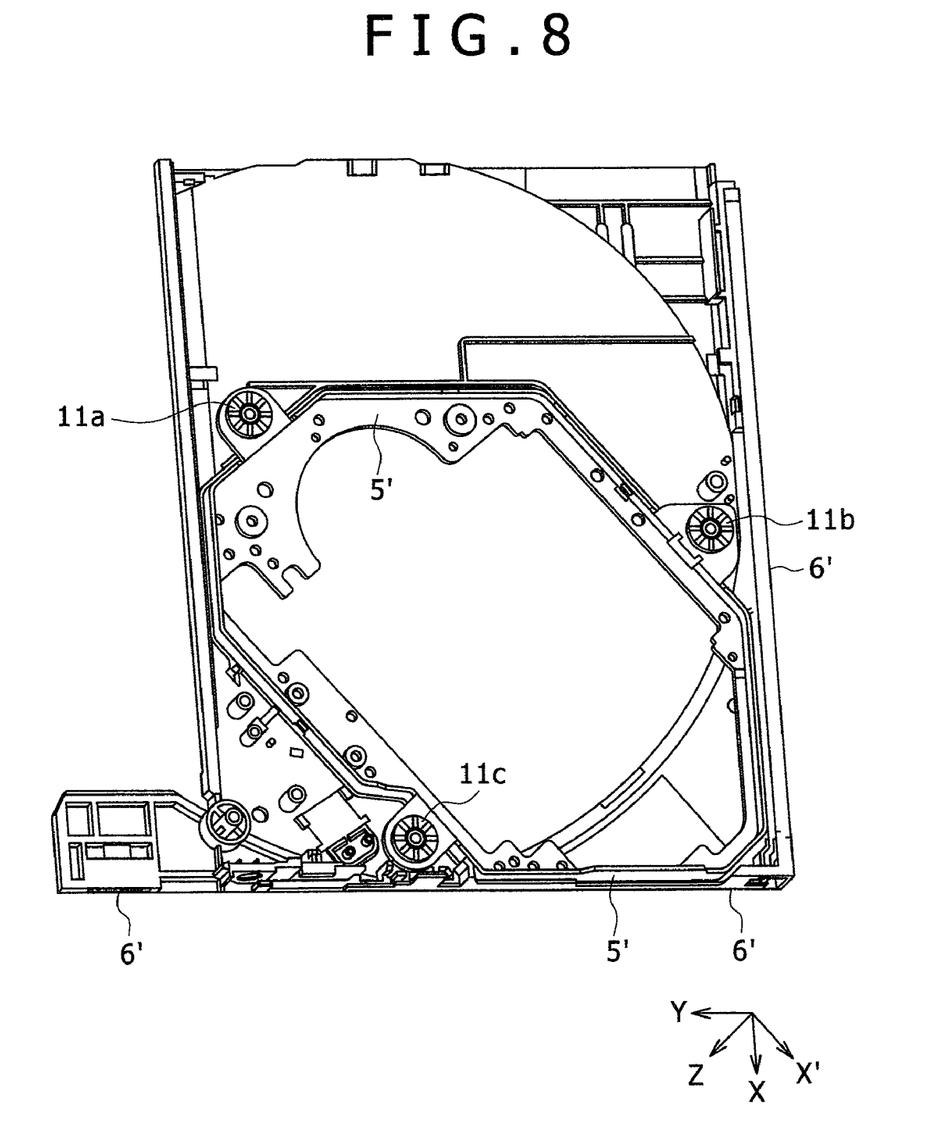
FIG. 8 is a configuration view of the tray and a chassis viewed from the rear surface side of the conventional optical disc apparatus.
Figure 9A:
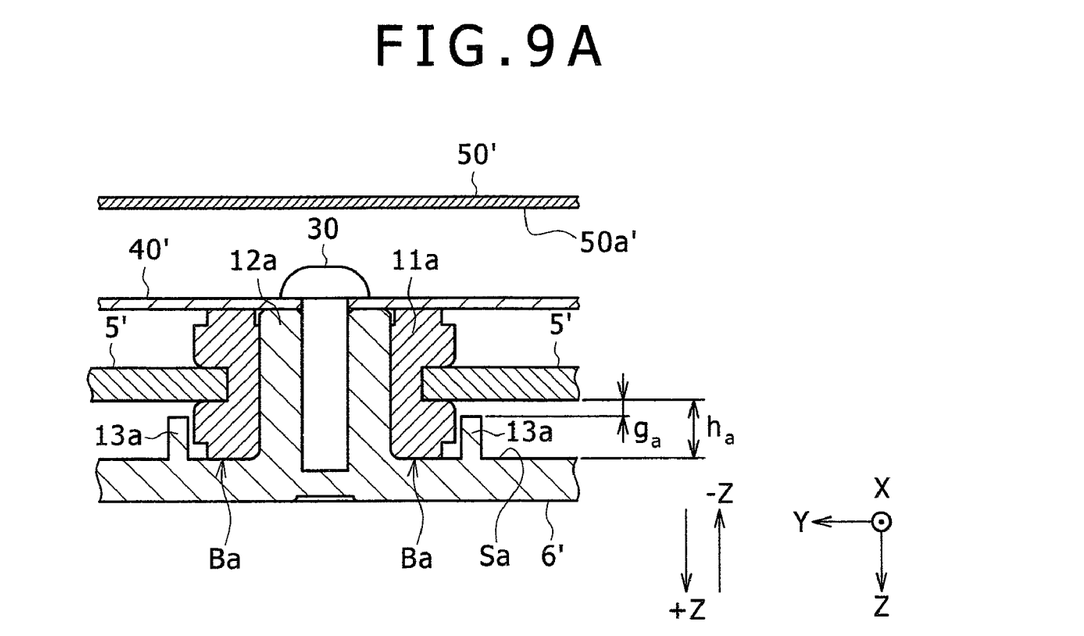
FIGS. 9A and 9B are cross sectional views of a coupling portion of the tray and the chassis in the conventional optical disc apparatus.
Figure 9B:
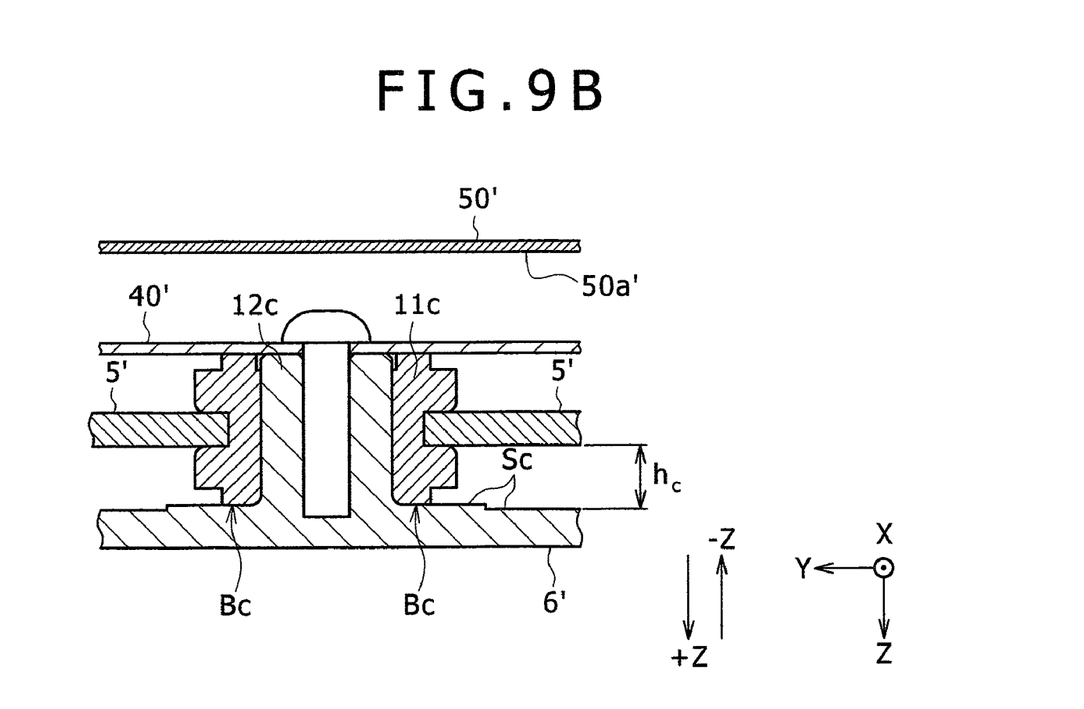

FIGS. 6 to 9B show configuration examples of a conventional thin optical disc apparatus 100'. FIG. 6 shows a plane configuration of the optical disc apparatus 100' on the front surface side (the side where an optical disc is mounted) (the +Z axis direction side), and is a view showing a state in which a top cover is removed. FIG. 7 is a perspective view showing a state in which a tray 6' is pulled out from a bottom case 50' of an apparatus body. FIG. 8 is a configuration view of the tray 6' and a chassis 5' viewed from the rear surface side (the -Z axis direction side) of the optical disc apparatus 100'. FIG. 9 is a cross sectional view of a coupling portion of the tray 6' and the chassis 5'.

In the optical disc apparatus 100', an optical pickup 4', a pickup moving mechanism, and a disc motor 3' are mounted on a chassis 5' of a unit mechanical portion (FIGS. 6 and 7), the chassis 5' is coupled to a tray 6' through vibration-proofing members at three positions A, B, and C (FIGS. 6, 8, 9A and 9B). Specifically, the unit mechanical portion is coupled to the tray 6' through the vibration-proofing members at the chassis 5' that configures a part of the unit mechanical portion. In FIGS. 6 and 7, the reference numeral 3a' denotes a turntable on which an optical disc is mounted, 3b' denotes a clamper which is inserted into a center hole of the optical disc (not shown) so as to clamp the optical disc, 8' denotes a flexible printed circuit board (FPC) which couples between the optical pickup 4' and a circuit substrate (not shown) on the unit mechanical portion, 50' denotes a bottom case which covers the apparatus from the rear surface side (the -Z axis direction side), and 51' denotes a rail member which is slidably engaged with an outer lateral end of the tray 6' to be moved in the ±X axis direction in accordance with the discharging and inserting of the tray 6'. The chassis 5' is coupled to the tray 6' through clampers at the three positions A, B, and C in each configuration shown in FIGS. 9A and 9B. Specifically, the chassis 5' is coupled to the tray 6' at the position A through a damper A11a as a vibration-proofing member (FIG. 9A). The chassis 5' is coupled to the tray 6' at the position C through a damper C11c as a vibration-proofing member (FIG. 9B). Although not shown in the drawing, the chassis 5' is coupled to the tray 6' at the position B in the same configuration as the position C. The chassis 5' is supported, through the damper A11a, at a position having a height ha from a tray surface Sa at the position A, and a rib 13a as a protrusion portion which protrudes in the chassis 5' direction is provided around the damper A11a. A gap with a distance $g_a$ is formed between a tip surface of the rib 13a and the chassis 5' (FIG. 9A). The chassis 5' is supported, through the damper C11c, at a position having a height $h_c$ from a tray surface Sc at the position C. The protrusion portion is not provided around the damper C11c (FIG. 9B). The chassis 5' is configured by, for example, a steel plate having a thickness of about $1.0 \times 10^{-3}$ m. Further, inside the bottom case 50', the bottom cover 40' is fixed to the tray 6' side at the three positions A, B, and C through screws 30, and end surfaces of the vibration-proofing members (dampers) on the -Z axis direction side are supported at the three positions by a plane surface of the bottom cover 20, and end surfaces on the +Z axis direction side (Ba in the case of the damper A11a and Bc in the case of the damper C11c) are supported by a plane surface of the tray 6'.

Further, in FIG. 7, a main circuit substrate 85' and a flexible printed circuit board (FPC) 80' which couples between the main circuit substrate 85' and a circuit substrate (not shown) on the unit mechanical portion are attached to a flat inner surface 50a' of the bottom case 50'. Especially, the flexible printed circuit board (FPC) 80' is formed to have a U-shaped plane surface, and one portion 80a' of the U-shaped plane surface is fixed on the flat inner surface 50a' of the bottom case 50'. The disc motor 3' is attached to the chassis 5' on the rear surface side (the -Z axis direction side) through a motor fixing plate (not shown). There is provided a bottom cover (not shown) fixed to the tray 6' under (the -Z axis direction) the motor fixing plate. When the tray 6' is discharged or inserted from/into the bottom case 50', the bottom cover is moved, together with the tray 6', on the upper side of the one portion 80a' of the flexible printed circuit board (FPC) 80' through a gap with a predetermined dimension. The reference numeral 10' denotes a front panel coupled to the tray 6'.

In the configuration, in the case where an impact force is applied to the optical disc apparatus 100' in the -Z axis direction, the impact force acts on the unit mechanical portion in the -Z axis direction. Then, the vibration-proofing members are compressed and deformed, and the whole unit mechanical portion is sunk in the -Z axis direction relative to the tray 6'. At this time, the optical disc which is being engaged with the clamper 3b' is also sunk and moved so as to become closer to the tray 6'. When the sunk amount is large, a surface of the optical disc on the outer circumferential side is brought into contact with a disc mounting surface of the tray 6'. When the sunk amount is much larger, the clamper 3b' is pulled out from the center hole of the optical disc in the contact state, and thus the optical disc is removed from the clamper $3b'$.

Figure 10:
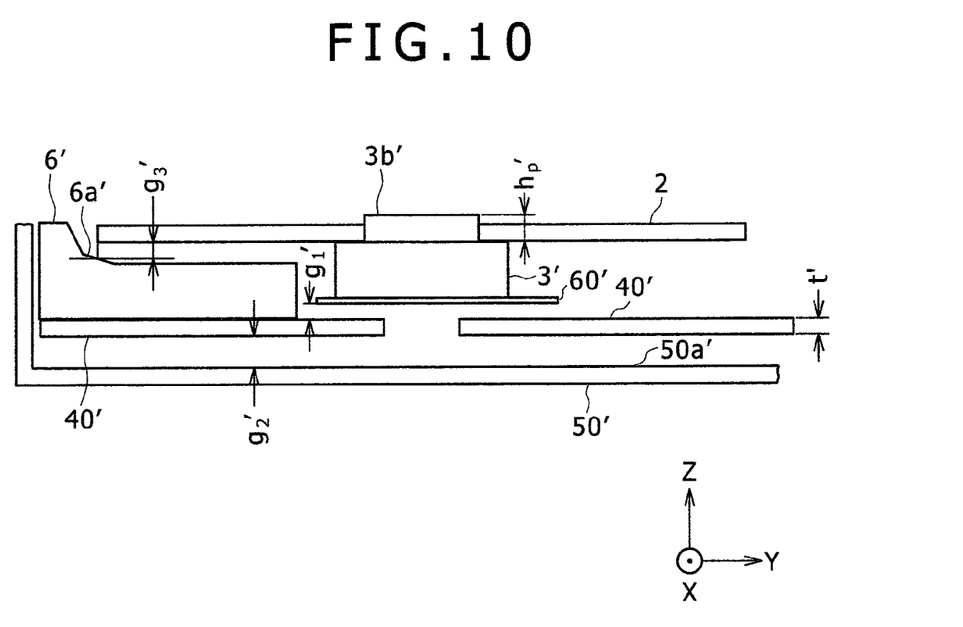
FIG. 10 is a cross sectional view showing a supporting state of the optical disc at the time of operation in the conventional optical disc apparatus.
Figure 11:
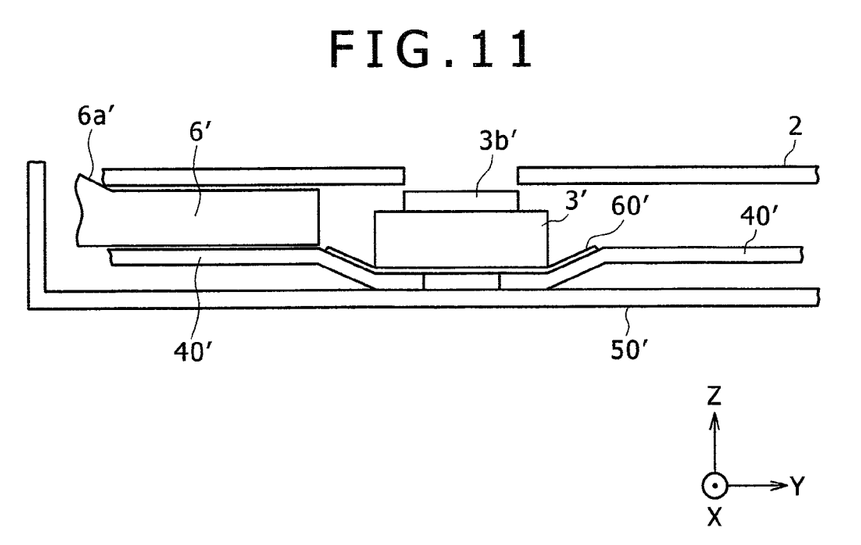
FIG. 11 is a cross sectional view showing changes in the supporting state of the optical disc when an impact force is applied at the time of operation in the conventional optical disc apparatus.

FIGS. 10 and 11 are cross sectional views, each showing a disc supporting state when recording or reproducing in the optical disc apparatus $100'$. FIG. 10 shows a state in which an impact force is not applied to the optical disc apparatus $100'$, and FIG. 11 shows a state in which an impact force is applied to the optical disc apparatus $100'$ in the −Z axis direction.

In FIG. 10, the optical disc 2 is clamped in such a manner that the clamper $3b'$ is inserted into the center hole of the optical disc 2. The disc motor $3'$ is fixed to the motor fixing plate $60'$, the motor fixing plate $60'$ is fixed to the chassis $5'$, and the chassis $5'$ is coupled to the tray $6'$ through the vibration-proofing members. In addition, the bottom cover $40'$ (with a thickness t) is fixed to the tray $6'$. In the optical disc apparatus $100'$, the sum of a distance (gap $g_1'$) between the motor fixing plate $60'$ and the bottom cover $40'$ and a distance (gap $g_2'$) between the bottom cover $40'$ and the bottom case $50'$ is equal to or larger in the rotational axis direction (the ±Z axis direction) of the disc motor $3'$ than the sum of a distance (gap $g_3'$) between the optical disc 2 and a disc mounting surface $6a'$ of the tray $6'$ and an insertion depth $h_p'$ by which the clamper $3b'$ is inserted into the center hole of the optical disc 2. Specifically, the relation of $g_1'+g_2' \geqq g_3'+h_p'$ (Formula 1) is satisfied.

In the case where an impact force is applied to the optical disc apparatus $100'$ in the −Z axis direction, the impact force acts on the unit mechanical portion in the −Z axis direction. Then, each of the vibration-proofing members (dampers A$11a$, B$11b$, and C$11c$) is compressed and deformed, and the whole unit mechanical portion is sunk by the distance $g_1'+g_2'$ in the −Z axis direction relative to the tray $6'$. At this time, the optical disc 2 is also sunk and moved (displaced) together with the clamper $3b'$, and a surface of the optical disc 2 on the outer circumferential side is brought into contact with the disc mounting surface $6a'$ of the tray $6'$ when the optical disc 2 is moved (displaced) by the distance $g_3'$. Further, when the unit mechanical portion is moved by the distance $g_1'$, the motor fixing plate $60'$ is brought into contact with the bottom cover $40'$. When the unit mechanical portion is moved by a distance larger than the distance $g_3'$, an insertion depth by which the clamper $3b'$ is inserted into the center hole of the optical disc 2 starts to be decreased. Furthermore, when the unit mechanical portion is moved by a distance larger than the distance $g_1'$, the motor fixing plate $60'$ starts to press and deform the bottom cover $40'$ in the −Z axis direction. Finally, in a state where the unit mechanical portion is moved by the distance $g_1'+g_2'$ in the −Z axis direction, the bottom cover $40'$ abuts on the inner surface $50a'$ of the bottom case $50'$ while being pressed by the motor fixing plate $60'$. Since the above-described Formula 1 is satisfied at this time, the clamper $3b'$ is pulled out from the center hole of the optical disc 2, that is, the optical disc 2 is removed from the clamper $3b'$ as shown in FIG. 11. If the optical disc 2 being rotated is removed from the clamper $3b'$, the optical disc 2 is damaged, or the optical disc apparatus $100'$ is broken in some cases. In an existing optical disc apparatus, for example, each of the distance $g_1'$ and distance $g_2'$ is as long as about $0.5 \times 10^{-3}$ m, and the distance $g_3'+h_p'$ is set to a dimension (from $0.8 \times 10^{-3}$ m to $0.9 \times 10^{-3}$ m) smaller than $1.0 \times 10^{-3}$ m. In addition, a thickness t' of the bottom cover $40'$ is as long as about $0.3 \times 10^{-3}$ m.

Figure 12:
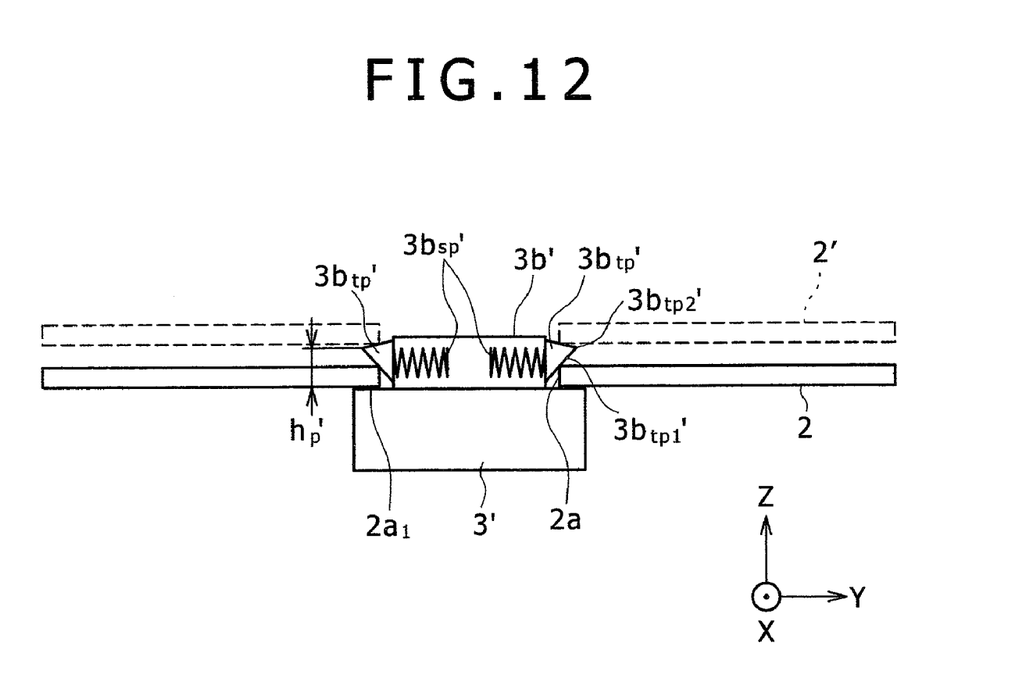
FIG. 12 is an explanation view of optical disc supporting by a clamper.

As shown in FIG. 12, the clamper $3b'$ has plural protrusion pieces $3b_{tp}'$ which protrude in the radius direction while being pressed by a spring $3b_{sp}'$, allows an oblique side portion $3b_{tp1}'$ of each protrusion piece $3b_{tp}'$ to abut on a marginal portion of the center hole of the optical disc 2, and clamps the optical disc 2 by using the spring restoring force of the spring $3b_{sp}'$. The insertion depth $h_p'$ by which the clamper $3b'$ is inserted into the center hole of the optical disc 2 corresponds to a dimension from a lower surface $2a_1$ of the center hole of the optical disc 2 to a tip portion $3b_{tp2}'$ of each protrusion piece $3b_{tp}'$ of the clamper $3b'$. In a state where the unit mechanical portion is moved by the distance $g_1'+g_2'$ in the −Z axis direction (FIG. 11), the tip portion $3b_{tp2}'$ of each protrusion piece $3b_{tp}'$ is moved on the lower side (the −Z axis direction) relative to the lower surface $2a_1$ of the center hole of the optical disc 2, the marginal portion of the center hole of the optical disc 2 is released from the restricted state caused by the oblique side portion $3b_{tp1}'$ of each protrusion piece $3b_{tp}'$, and the optical disc 2 is removed from the clamper $3b'$ (shown by an optical disc $2'$).

Figure 13:
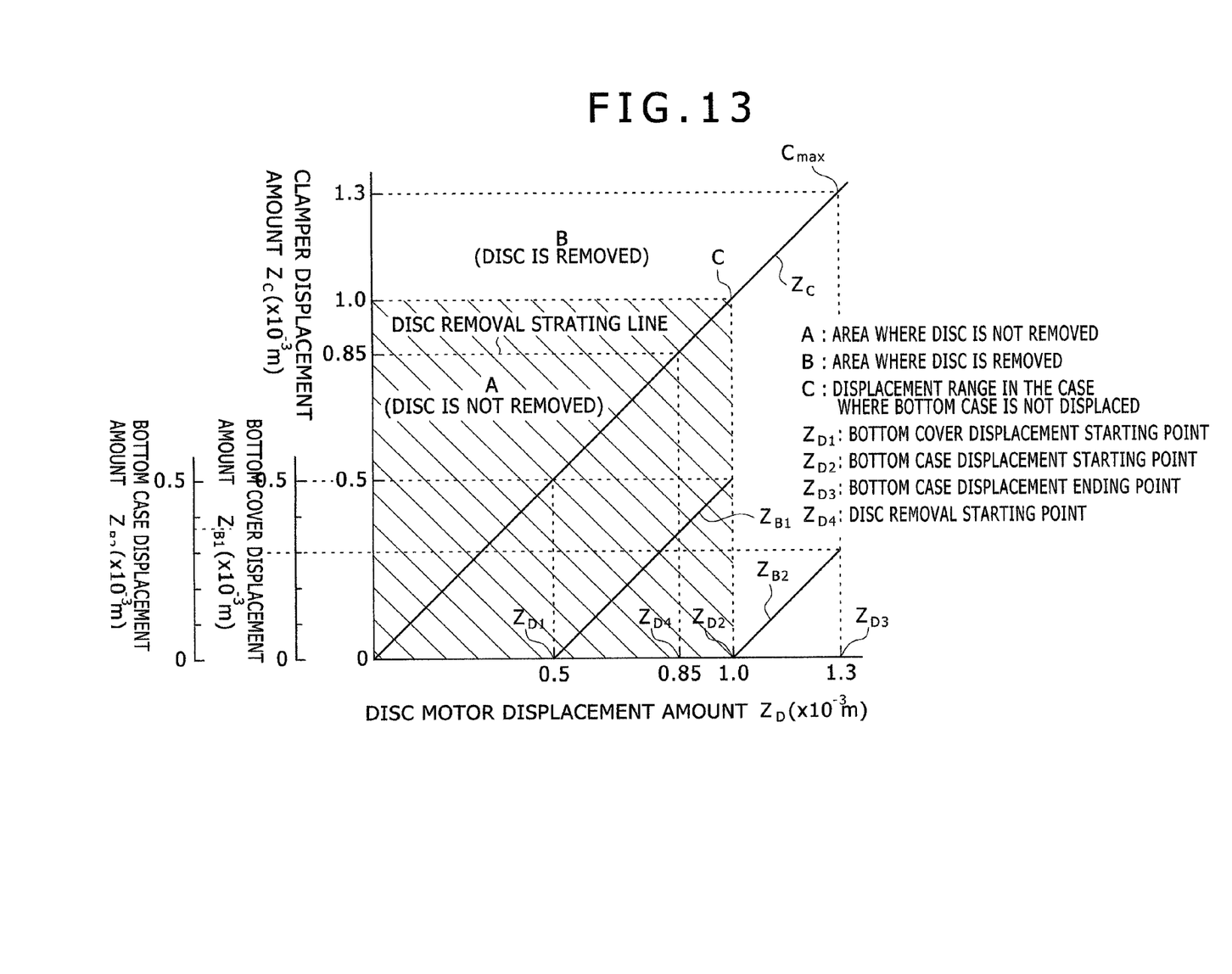
FIG. 13 is an explanation view of displacement of an optical disc supporting portion when an impact force is applied at the time of operation in the conventional optical disc apparatus.

FIG. 13 is a view explaining a relation among a displacement amount $Z_D$ of the disc motor $3'$ in the −Z axis direction, a corresponding displacement amount $Z_C$ of the clamper $3b'$ in the −Z axis direction, a corresponding displacement amount $Z_{B1}$ of the bottom cover $40'$ in the −Z axis direction, and a corresponding displacement amount $Z_{B2}$ of the bottom case $50'$ in the −Z axis direction when an impact force is applied to the optical disc apparatus $100'$ in the −Z axis direction. Each of the distance $g_1'$ and the distance $g_2'$ (FIG. 10) is as long as $0.5 \times 10^{-3}$ m. In FIG. 13, at a point $Z_{D1}$ (bottom cover displacement starting point) where the unit mechanical portion is moved in the −Z axis direction by the impact force and the disc motor $3'$ is moved by the distance $g_1'=0.5 \times 10^{-3}$ m, the motor fixing plate $60'$ under the disc motor $3'$ is brought into contact with the bottom cover $40'$, and then the disc motor $3'$ and the motor fixing plate $60'$ are moved and displaced in the −Z axis direction together with the bottom cover $40'$. Then, at a point $Z_{D2}$ where the disc motor $3'$ is moved by the distance $g_2'=0.5 \times 10^{-3}$ m, the motor fixing plate $60'$ abuts on the inner surface $50a'$ of the bottom case $50'$. A point C is a point indicating the displacement amount $Z_D$ of the disc motor $3'$ and the displacement amount $Z_C$ of the clamper $3b'$ at this time (in the case where the bottom case $50'$ is not displaced). In the case where the bottom case $50'$ is displaced by, for example, $0.3 \times 10^{-3}$ m, the disc motor $3'$ and the motor fixing plate $60'$ are moved and displaced together with the bottom cover $40'$ and the bottom case $50'$ after the point $Z_{D2}$ (bottom case displacement starting point) to reach a point $Z_{D3}$ (bottom case displacement ending point). A point $C_{max}$ is a point indicating the displacement amount $Z_D$ of the disc motor $3'$ and the displacement amount $Z_C$ of the clamper $3b'$ at this time. In the optical disc apparatus $100'$, the clamper $3b'$ is pulled out from the center hole of the optical disc at a displacement amount $Z_{D4}$ (assumed as $0.85 \times 10^{-3}$ m) (disc removal starting point) of the disc motor $3'$ which is smaller than $g_1'+g_2'(=1.0 \times 10^{-3}$ m), and thus the disc removal occurs. Accordingly, the disc removal occurs before the point C where the motor fixing plate $60'$ is displaced together with the disc motor $3'$ to abut on the inner surface $50a'$ of the bottom case $50'$. $Z_D=0.85 \times 10^{-3}$ m and $Z_C=0.85 \times 10^{-3}$ m are border lines where the disc removal starts. In FIG. 13, A denotes an area where the disc removal does not occur, and B denotes an area where the disc removal occurs.

As described above, in the case where an impact force is applied to the optical disc apparatus $100'$, the optical disc is removed from the clamper $3b'$ resulting from the configuration in which the relation of the above-described Formula 1 is satisfied, and a recording or reproducing operation is accordingly interrupted. In addition, the optical disc and the apparatus are damaged, and the reliability of the apparatus is deteriorated.

In view of the foregoing circumstances of the conventional techniques, a problem of the present invention is to improve impact resistance under a simple configuration in an optical disc apparatus, and to prevent an optical disc from being removed from a clamper even when an impact force is applied during a recording or reproducing operation.

An object of the present invention is to solve the problem and to provide an optical disc apparatus in which the reliability is secured.

In order to solve the problem, in an optical disc apparatus of the present invention, a displacement amount by which a disc motor is sunk on the bottom case side is suppressed. In more detail, a convex portion which protrudes in the bottom cover direction is provided at a region including the whole or a part of an orthographically-projected surface of the disc motor on a surface of the bottom case opposed to a rear surface of the disc motor, and in a state of recording or reproducing, the sum of a distance between a motor fixing plate and a bottom cover and a distance between the bottom cover and the convex portion of the bottom case is smaller in the rotational axis direction of the disc motor than the sum of a distance between an optical disc and a tray and an insertion depth by which a clamper is inserted into a center hole of the optical disc.

According to the present invention, it is possible to improve impact resistance in an optical disc apparatus, and to improve the reliability of the apparatus by preventing an optical disc from being removed from a clamper.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENT

Hereinafter, an embodiment of the present invention will be described using the drawings.

Figure 1:
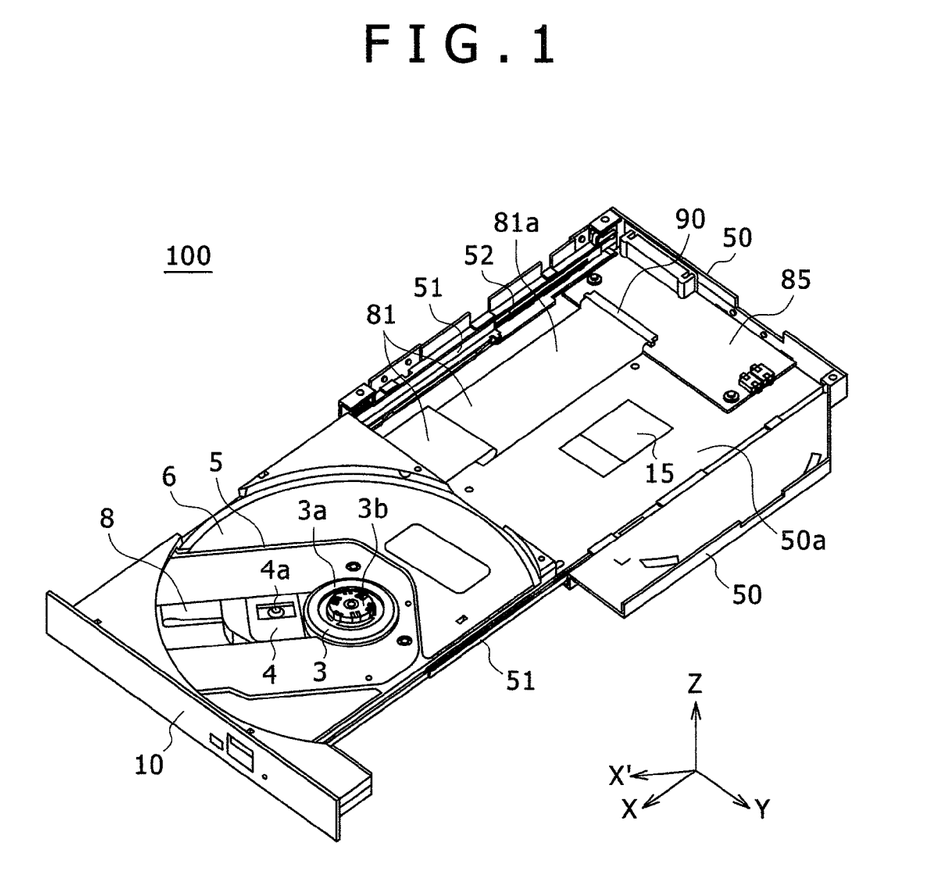
FIG. 1 is a view of a configuration example of an optical disc apparatus as an embodiment of the present invention.
Figure 2A:
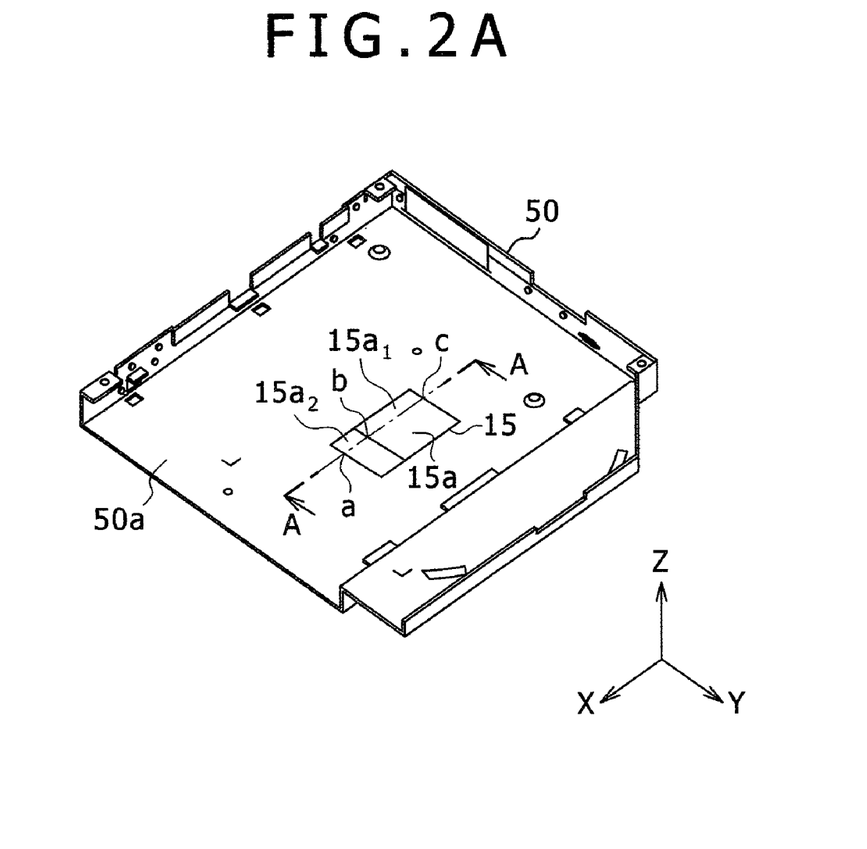
FIGS. 2A and 2B are views, each showing a structure of a bottom case of the optical disc apparatus in FIG. 1.
Figure 2B:
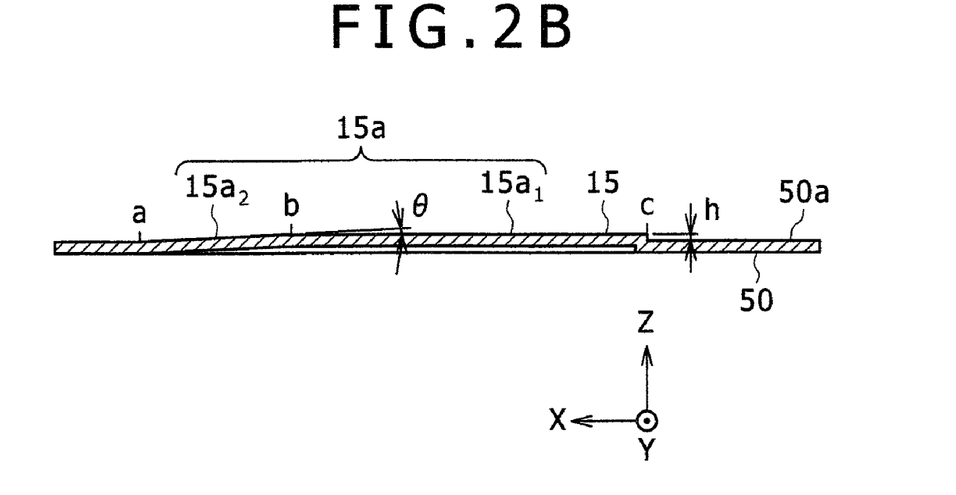
Figure 3:
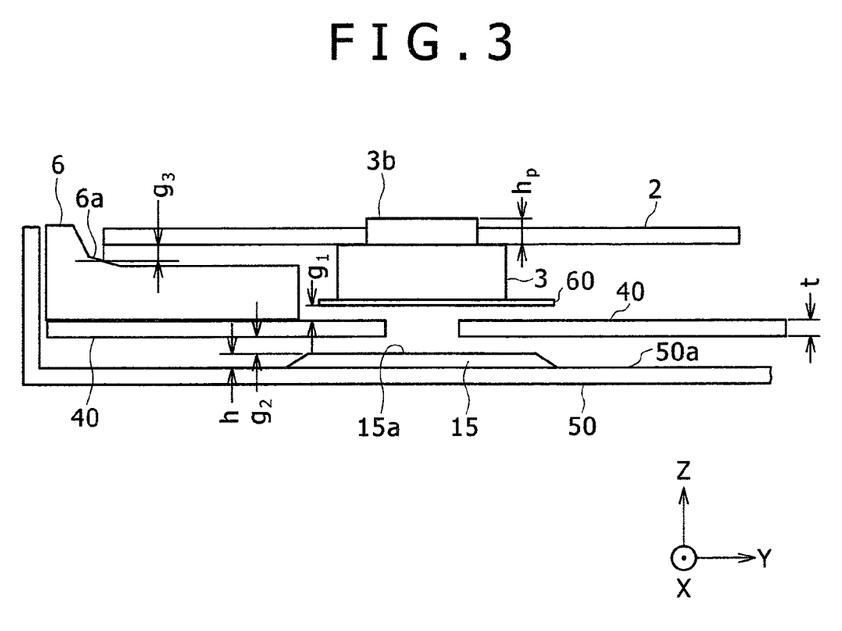
FIG. 3 is a cross sectional view showing a supporting state of an optical disc at the time of operation in the optical disc apparatus in FIG. 1.
Figure 4:
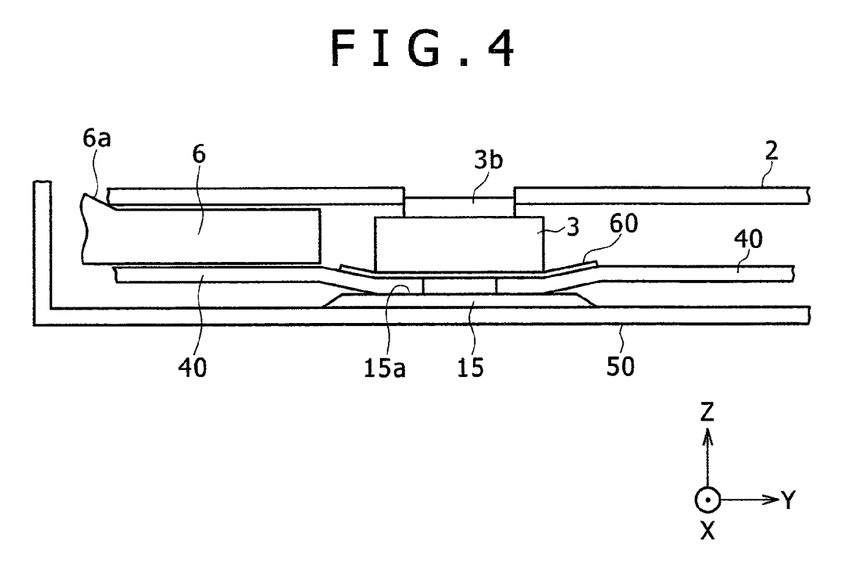
FIG. 4 is a cross sectional view showing changes in the supporting state of the optical disc when an impact force is applied at the time of operation in the optical disc apparatus in FIG. 1.
Figure 5:
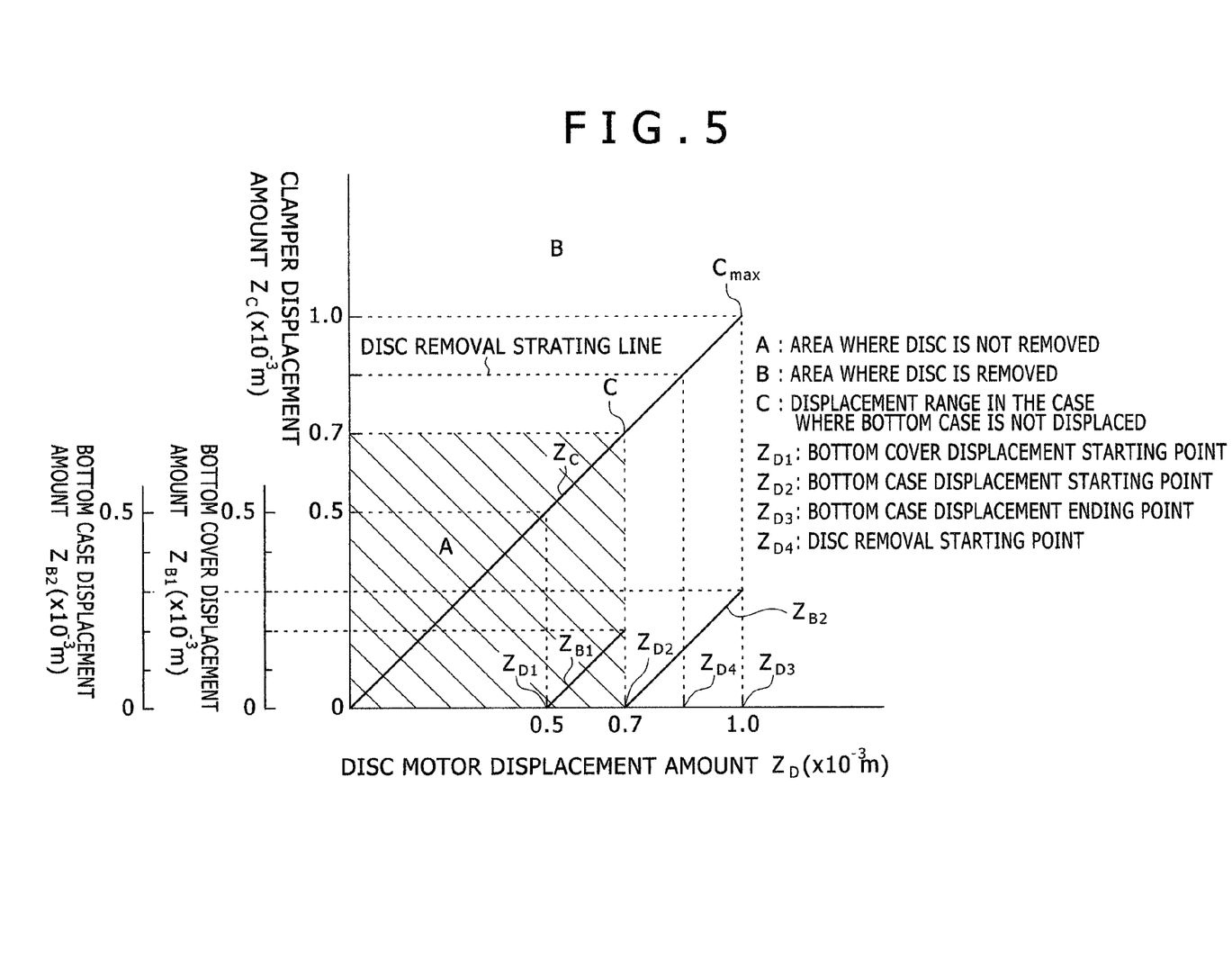
FIG. 5 is an explanation view of displacement of an optical disc supporting portion when an impact force is applied at the time of operation in the optical disc apparatus in FIG. 1.

FIGS. 1 to 5 are explanation views according to the embodiment of the present invention. FIG. 1 is a configuration view of an optical disc apparatus as the embodiment of the present invention, and is also a perspective view showing a state in which a tray is pulled out from an apparatus body. FIGS. 2A and 2B are configuration views of a bottom case of the optical disc apparatus in FIG. 1. FIGS. 3 and 4 are views, each showing a state of a disc supporting portion when the optical disc apparatus in FIG. 1 is in a recording or reproducing state. FIG. 3 shows a state in which an impact force is not applied, and FIG. 4 shows a state in which an impact force is applied in the −Z axis direction. FIG. 5 is a view explaining a relation between a displacement amount of a disc motor in the −Z axis direction and a corresponding displacement amount of each of a clamper, a bottom cover, and the bottom case in the −Z axis direction when an impact force is applied to the optical disc apparatus in FIG. 1 in the −Z axis direction.

In FIG. 1, the reference numeral 100 denotes an optical disc apparatus as an embodiment of the present invention, 3 denotes a disc motor which drives an optical disc (not shown) as a recording medium to rotate, 3a denotes a turntable, 3b denotes a clamper which clamps the optical disc, 4 denotes an optical pickup which irradiates a laser beam onto the optical disc and receives its reflection light, and 4a denotes an objective lens. The optical pickup 4 is moved in a substantially radius direction (the ±X' direction in FIG. 1) of the optical disc by a pickup moving mechanism (not shown). The pickup moving mechanism includes a lead screw member (not shown) which has a screw on its surface and which allows the optical pickup 4 to be moved by rotating the screw, a guide member (not shown) which guides the movement of the optical pickup 4, and a feed motor (not shown) which drives the lead screw member to rotate. The reference numeral 5 denotes a chassis in which the optical pickup 4, the pickup moving mechanism, the disc motor 3, and the like are mounted, 6 denotes a tray which is coupled to the chassis 5 so as to insert the optical disc into the apparatus body of the optical disc apparatus 100 or discharge the optical disc from the apparatus body, and 10 denotes a front panel which is coupled to the tray 6. The disc motor 3 is coupled to the chassis 5 through a plate-like motor fixing plate. Specifically, the disc motor 3 is fixed to the motor fixing plate, and the motor fixing plate is fixed to the chassis 5. The optical pickup 4, the pickup moving mechanism, the disc motor 3, the chassis 5, and the motor fixing plate configure a unit mechanical portion of the optical disc apparatus 100. The chassis 5 configures an outer circumferential portion of the unit mechanical portion as a base of the unit mechanical portion, and is configured by, for example, a steel plate having a thickness of about $1.0 \times 10^{-3}$ m. Under the motor fixing plate (the −Z axis direction), there is provided a bottom cover (not shown) whose plane surface is coupled to a surface of the tray 6 opposite to a disc mounting surface while being in substantially parallel to a plane surface of the motor fixing plate. The chassis 5 is coupled to the tray 6 at three positions in the optical disc apparatus 100 through dampers A11a, B11b, and C11c as vibration-proofing members, as similar to the chassis 5' of the optical disc apparatus 100' which is explained using FIGS. 6, 8, 9A and 9B, and which is coupled to the tray 6' at the three positions A, B, and C through the dampers as vibration-proofing members. Specifically, the unit mechanical portion is coupled to the tray 6 at the chassis 5 as a part of the unit mechanical portion through the dampers A11a, B11b, and C11c. The bottom case and the bottom cover in the optical disc apparatus 100 are also arranged at the same positions as the bottom case 50' and the bottom cover 40' in the optical disc apparatus 100'. The tray 6 is configured by molded resin, and each of the dampers A11a, B11b, and C11c is configured by a member having elasticity such as rubber (including synthetic rubber) and synthetic resin. In FIGS. 9A and 9B, the reference numeral 12a denotes a damper engaging portion A on the tray 6 with the outer circumference of which the damper A11a is engaged, and 12c denotes a damper engaging portion C on the tray 6 with the outer circumference of which the damper C11c is engaged. A damper engaging portion on the tray 6 with which the damper B11b is engaged has basically the same configuration as the damper engaging portion C. In the optical disc apparatus 100, the damper engaging portion 12a is provided at a position corresponding to the position A in FIG. 6, the damper engaging portion 12b is provided at a position corresponding to the position B in FIG. 6, and the damper engaging portion 12c is provided at a position corresponding to the position C in FIG. 6.

Further, in FIG. 1, the reference numeral 8 denotes a flexible printed circuit board (FPC) which couples between the optical pickup 4 and a circuit substrate (not shown) on the unit mechanical portion, 50 denotes a bottom case which is arranged outside in the −Z axis direction relative to the bottom cover to cover a rear surface of the optical disc apparatus 100, 50a denotes an inner surface of the bottom case 50, 51 denotes a rail member which is slidably engaged with an outer lateral end of the tray 6 to be moved in the ±X axis direction in accordance with the discharging and inserting of the tray 6, 52 denotes a guide rail member which is engaged with the rail member 51 on the outer side to guide the movement of the rail member 51, 15 denotes a convex portion which is provided on the surface (hereinafter, referred to as the inner surface of the bottom case 50) 50a of the bottom case 50 that is opposed to a rear surface of the disc motor 3 and which protrudes in the bottom cover direction (the Z axis direction), 85 denotes a main circuit substrate of the optical disc apparatus 100, 90 denotes a connector, and 81 denotes a flexible printed circuit board (FPC) which couples between the circuit substrate on the unit mechanical portion and the main circuit substrate 85. On the inner surface 50a of the bottom case 50, the convex portion 15 is provided, in a state where the optical disc apparatus 100 is ready to perform a recording or reproducing operation, in a range which includes the whole or a part of a region where the disc motor 3 is orthographically projected in its rotational axis direction (the −Z axis direction), namely, in a region which is located outside the bottom cover and which includes the whole or a part of an orthographically-projected surface of the disc motor 3 on the bottom case surface opposed to the rear surface of the disc motor 3. Further, the flexible printed circuit board (FPC) 81 is configured in a band shape, and a portion 81a of a plane surface of the flexible printed circuit board 81 which is arranged on the inner surface 50a of the bottom case 50 is fixed on the inner surface 50a by adhesion or the like. On the inner surface 50a of the bottom case 50, the convex portion 15 is provided at a plane surface area different from the fixed portion 81a of the flexible printed circuit board (FPC) 81.

FIGS. 2A and 2B are configuration views of the bottom case 50 in the optical disc apparatus 100 in FIG. 1. FIG. 2A is a perspective view of the bottom case 50, and FIG. 2B is a cross sectional view taken along the line A-A of the convex portion 15 provided on the inner surface 50a of the bottom case 50.

In FIGS. 2A and 2B, the convex portion 15 has a structure (drawing structure) formed by drawing, and a height h of the protrusion ranges from $0.2 \times 10^{-3}$ m to $0.4 \times 10^{-3}$ m. A tip surface 15a of the convex portion 15 has a first surface $15a_1$ which is in substantially parallel to the inner surface 50a of the bottom case 50, and a second surface $15a_2$ which is located in the X axis direction relative to the first surface $15a_1$ and which is inclined by an angle θ relative to the inner surface 50a or the first surface $15a_1$. The second surface $15a_2$ is formed between points a and b in the ±X axis direction, and the first surface $15a_1$ is formed between points b and c. Even in the case where the bottom cover 40 is brought into contact with the inner surface 50a of the bottom case 50 and the tip surface 15a of the convex portion 15 during the discharging and inserting of the tray 6 from/into the apparatus body, the provision of the second surface $15a_2$ prevents the bottom cover from being stuck at the convex portion 15, and allows the bottom cover to be smoothly moved in the ±X axis direction together with the tray 6.

FIGS. 3 and 4 are views, each showing a state of a disc supporting portion when the optical disc apparatus 100 in FIG. 1 is in a recording or reproducing state. FIG. 3 shows a state in which an impact force is not applied, and FIG. 4 shows a state in which an impact force is applied in the −Z axis direction.

In FIGS. 3 and 4, the reference numeral 6a denotes a disc mounting surface of the tray 6, 15a denotes a tip surface of the convex portion 15, 40 denotes a bottom cover, 60 denotes a motor fixing plate, $g_1$ denotes a gap between the motor fixing plate 60 and the bottom cover 40, namely, a distance (first distance) between the motor fixing plate 60 and the bottom cover 40 in the rotational axis direction (the ±Z axis direction) of the disc motor 3, $g_2$ denotes a gap between the bottom cover 40 and the bottom case 50, namely, a distance (second distance) between the bottom cover 40 and the bottom case 50 in the rotational axis direction (the ±Z axis direction) of the disc motor 3, $g_3$ denotes a distance (third distance) between an optical disc 2 and the disc mounting surface 6a of the tray 6, t denotes a thickness of the bottom cover 40, and $h_p$ denotes an insertion depth by which the clamper 3b is inserted into a center hole of the optical disc 2. In a recording or reproducing state in the optical disc apparatus 100, the sum of the first distance $g_1$ between the motor fixing plate 60 and the bottom cover 40 and the second distance $g_2$ between the bottom cover 40 and the convex portion 15 of the bottom case 50 is smaller in the rotational axis direction of the disc motor than the sum of the third distance $g_3$ between the optical disc 2 and the tray 6 and the insertion depth $h_p$ by which the clamper 3b is inserted into the center hole of the optical disc 2. That is, the relation of $g_1+g_2<g_3+h_p$ (Formula 2) is satisfied.

In addition, the relation between the first distance $g_1$ and the second distance $g_2$ satisfies $g_1>g_2$, and the distance between the bottom cover 40 and the inner surface 50a of the bottom case 50 is accordingly suppressed from increasing.

In the case where an impact force is applied to the optical disc apparatus 100 according to the configuration in the −Z axis direction, the impact force acts on the unit mechanical portion in the −Z axis direction so as to change the state shown in FIG. 3. Specifically, each of the vibration-proofing members (dampers A11a, B11b, and C11c) is compressed and deformed, and the whole unit mechanical portion is sunk by the distance $g_1+g_2$ in the $-Z$ axis direction relative to the tray 6. At this time, the optical disc 2 is also sunk and moved in the $-Z$ axis direction together with the clamper 3b, and a surface of the optical disc 2 on the outer circumferential side is brought into contact with the disc mounting surface 6a of the tray 6 when the optical disc 2 is moved by the distance $g_3$. Further, when the unit mechanical portion is moved by the distance $g_1$, the motor fixing plate 60 is brought into contact with the bottom cover 40. When the unit mechanical portion is moved in the $-Z$ axis direction by a distance larger than the distance $g_3$, the clamper 3b starts to be pulled out from the center hole of the optical disc 2 in the $-Z$ axis direction. Specifically, the insertion depth $h_p$ by which the clamper 3b is inserted into the center hole of the optical disc 2 starts to be decreased. Furthermore, when the unit mechanical portion is moved in the $-Z$ axis direction by a distance larger than the distance $g_1$, the motor fixing plate 60 starts to press and deform the bottom cover 40 in the $-Z$ axis direction. Finally, in a state where the unit mechanical portion is moved (displaced) by the distance $g_1+g_2$ in the $-Z$ axis direction, the bottom cover 40 abuts on the tip surface 15a (in a precise sense, the first surface $15a_1$ of the tip surface 15a (FIG. 2)) of the convex portion 15 of the bottom case 50 while being pressed by a surface of the motor fixing plate 60 in the $-Z$ axis direction. Since the above-described Formula 2 is satisfied at this time, the clamper 3b is not pulled out from the center hole of the optical disc 2, and a part of the clamper 3b remains in the center hole, as shown in FIG. 4. Accordingly, the optical disc 2 is prevented from being removed from the clamper 3b. It is assumed in the optical disc apparatus 100 that the distance $g_1$ is as long as about $0.5\times10^{-3}$ m, the distance $g_2$ is as long as about $0.2\times10^{-3}$ m, and the distance $g_3+h_p$ ranges from $0.8\times10^{-3}$ m to $0.9\times10^{-3}$ m. Especially, it is conceivable that a required dimensional range of the distance $g_2$ in consideration of making the apparatus thinner is from $0.15\times10^{-3}$ m to $0.3\times10^{-3}$ m from the viewpoint of component accuracy of the bottom cover 40 and the bottom case 50, and the distance $g_2$ is as long as about $0.2\times10^{-3}$ m within the range in the optical disc apparatus 100. In addition, the thickness t of the bottom cover 40 is as long as about $0.3\times10^{-3}$ m in the optical disc apparatus 100.

The clamper 3b has basically the same configuration as the clamper 3b' shown in FIG. 12, and has a configuration in which the reference numerals 3b', 3', and $h_p$' in FIG. 12 are changed to 3b, 3, and $h_p$, respectively. Specifically, the clamper 3b has plural protrusion pieces $3b_{tp}$' which protrude in the radius direction while being pressed by a spring $3b_{sp}$', allows an oblique side portion $3b_{tp1}$' of each protrusion piece $3b_{tp}$' to abut on a marginal portion of the center hole of the optical disc 2, and clamps the optical disc 2 by using the spring restoring force of the spring $3b_{sp}$'. The insertion depth $h_p$ by which the clamper 3b is inserted into the center hole of the optical disc 2 corresponds to a dimension from a lower surface $2a_1$ of the center hole of the optical disc 2 to a tip portion $3b_{tp2}$' of each protrusion piece $3b_{tp}$' of the clamper 3b. In a state where the unit mechanical portion is moved by the distance $g_1+g_2$ in the $-Z$ axis direction (FIG. 4), the tip portion $3b_{tp2}$' of each protrusion piece $3b_{tp}$' remains on the upper side (the +Z axis direction) relative to the lower surface $2a_1$ of the center hole of the optical disc 2, the marginal portion of the center hole of the optical disc 2 is restricted to move by the tip portion $3b_{tp2}$' or the oblique side portion $3b_{tp1}$' of each protrusion piece $3b_{tp}$', and the optical disc 2 is prevented from being removed from the clamper 3b.

FIG. 5 is a view explaining a relation among a displacement amount $Z_D$ of the disc motor 3 in the $-Z$ axis direction, a corresponding displacement amount $Z_C$ of the clamper 3b in the $-Z$ axis direction, a corresponding displacement amount $Z_{B1}$ of the bottom cover 40 in the $-Z$ axis direction, and a corresponding displacement amount $Z_{B2}$ of the bottom case 50 in the $-Z$ axis direction when an impact force is applied to the optical disc apparatus 100 in the $-Z$ axis direction. The distance $g_1$ is as long as $0.5\times10^{-3}$ m, and the distance $g_2$ is as long as about $0.2\times10^{-3}$ m. In FIG. 5, at a point $Z_{D1}$ (bottom cover displacement starting point) where the unit mechanical portion is moved in the $-Z$ axis direction by the impact force and the disc motor 3 is moved by the distance $g_1=0.5\times10^{-3}$ m, the motor fixing plate 60 under the disc motor 3 is brought into contact with the bottom cover 40, and then the disc motor 3 and the motor fixing plate 60 are moved and displaced in the $-Z$ axis direction together with the bottom cover 40. Then, at a point $Z_{D2}$ where the disc motor 3 is moved by the distance $g_2=0.2\times10^{-3}$ m, the motor fixing plate 60 abuts on the first surface $15a_1$ of the tip surface 15a of the convex portion 15 on the inner surface 50a of the bottom case 50. A point C is a point indicating the displacement amount $Z_D$ of the disc motor 3 and the displacement amount $Z_C$ of the clamper 3b at this time (in the case where the bottom case 50 is not displaced). In the case where the bottom case 50 is displaced by, for example, $0.3\times10^{-3}$ m, the disc motor 3 and the motor fixing plate 60 are moved and displaced together with the bottom cover 40 and the bottom case 50 after the point $Z_{D2}$ (bottom case displacement starting point) to reach a point $Z_{D3}$ (bottom case displacement ending point). A point $C_{max}$ is a point indicating the displacement amount $Z_D$ of the disc motor 3 and the displacement amount $Z_C$ of the clamper 3b at this time. In the optical disc apparatus 100, it is assumed that disc removal occurs at the point $Z_D=0.85\times10^{-3}$ m and the point $Z_C=0.85\times10^{-3}$ m. Accordingly, the clamper 3b is pulled out from the center hole of the disc for the first time to cause the disc removal at a displacement amount $Z_{D4}(=0.85\times10^{-3}$ m) (disc removal starting point) of the disc motor 3 that is larger than $g_1+g_2$ ($=0.7\times10^{-3}$ m). Thus, the disc removal does not occur at or before the point C where the motor fixing plate 60 is displaced together with the disc motor 3 to abut on the first surface $15a_1$ of the tip surface 15a of the convex portion 15 on the inner surface 50a of the bottom case 50. The disc removal occurs for the first time at the point $Z_D=0.85\times10^{-3}$ m$=Z_{D4}$, and the point $Z_C=0.85\times10^{-3}$ m. In FIG. 5, A denotes an area where the disc removal does not occur, and B denotes an area where the disc removal occurs.

As described above, Formula 2 is satisfied in the optical disc apparatus 100. Accordingly, even when an impact force is applied, the optical disc is prevented from being removed from the clamper 3b, thus securing the reliability of the apparatus.

In the above-described embodiment, as the convex portion 15 on the inner surface 50a of the bottom case 50, there has been described the drawing structure in which the convex portion 15 is integrated with the bottom case 50. However, the convex portion may be formed by providing a sheet-like member on the inner surface 50a of the bottom case 50. In this case, if a material that is excellent in abrasion resistance is selected as the sheet-like member, the material is hardly scratched even when the bottom cover 40 is brought into contact therewith, thus suppressing the deterioration. In the above-described embodiment, the tip surface 15a of the convex portion 15 has the first surface $15a_1$ which is in substantially parallel to the inner surface 50a of the bottom case 50, and the second surface $15a_2$ which is located in the X axis direction relative to the first surface $15a_1$ and which is inclined by the angle θ relative to the inner surface 50a or the first surface $15a_1$. However, the second surface $15a_2$ is not limited to a plane surface and may be formed in the shape of an inclined surface such as a curved surface. Further, in the above-described embodiment, the plane shape (the shape viewed from the Z axis direction) of the protrusion portion 15 is illustrated as a rectangle shape. However, the plane shape of the protrusion portion 15 is not limited thereto, but may be other shapes. Furthermore, the tip surface 15$a$ of the convex portion 15 has the first surface 15$a_1$ which is in substantially parallel to the inner surface 50$a$ of the bottom case 50, and the second surface 15$a_2$ which is located in the X axis direction relative to the first surface 15$a_1$ and which is inclined by the angle $\theta$ relative to the inner surface 50$a$ or the first surface 15$a_1$ in the above-described embodiment. However, without providing the first surface 15$a_1$ which is in substantially parallel to the inner surface 50$a$ of the bottom case 50, at least an inclined surface relative to the inner surface 50$a$ may be provided in a region including the whole or a part of the orthographically-projected surface of the disc motor 3 on the inner surface 50.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus which records or reproduces information onto/from an optical disc, the apparatus comprising:
    an optical pickup which irradiates a laser beam onto the optical disc to receive its reflection light;
    a pickup moving mechanism which allows the optical pickup to be moved in a substantially radius direction of the optical disc;
    a disc motor which drives the optical disc to rotate;
    a clamper which is fixed to a rotational portion of the disc motor and which is engaged with a center hole of the optical disc or a marginal portion of the center hole of the optical disc when the optical disc is rotated;
    a chassis in which the optical pickup, the pickup moving mechanism, and the disc motor are mounted;
    a motor fixing plate through which the disc motor is attached to the chassis;
    a tray which is coupled to the chassis to insert or discharge the optical disc into/from an apparatus body;
    a bottom cover which is coupled to a surface opposite to a disc mounting surface of the tray; and
    a bottom case which is arranged outside the bottom cover and which has a convex portion protruding in the bottom cover direction at a region including the whole or a part of an orthographically-projected surface of the disc motor on a surface opposed to a rear surface of the disc motor,
    wherein in a recording or reproducing state, the sum of a first distance between the motor fixing plate and the bottom cover and a second distance between the bottom cover and the convex portion of the bottom case is smaller in the rotational axis direction of the disc motor than the sum of a third distance between the optical disc and the tray and an insertion depth by which the clamper is inserted into the center hole of the optical disc.

2. The optical disc apparatus according to claim 1, wherein the bottom case has a configuration in which the convex portion is formed by drawing.

3. The optical disc apparatus according to claim 1, wherein the bottom case has a configuration in which the convex portion has an inclined surface relative to a surface of the bottom case opposed to the rear surface of the disc motor.

4. The optical disc apparatus according to claim 1, wherein when an impact force is applied in the rotational axis direction of the disc motor, the bottom cover is pressed and deformed by the motor fixing plate, and a tip surface of the bottom cover abuts on the convex portion of the bottom case.

5. The optical disc apparatus according to claim 1, wherein the second distance is smaller than the first distance.

6. The optical disc apparatus according to claim 2, wherein the second distance is smaller than the first distance.

7. The optical disc apparatus according to claim 3, wherein the second distance is smaller than the first distance.

8. The optical disc apparatus according to claim 4, wherein the second distance is smaller than the first distance.

* * * * *